(12) United States Patent
Gordon et al.

(10) Patent No.: US 12,539,840 B2
(45) Date of Patent: Feb. 3, 2026

(54) SYSTEM AND METHOD FOR PROBING PROPERTIES OF A TRAILER TOWED BY A TOWING VEHICLE IN A HEAVY-DUTY VEHICLE COMBINATION

(71) Applicant: Volvo Truck Corporation, Gothenburg (SE)

(72) Inventors: Timothy Gordon, Lincoln (GB); Yangyan Gao, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 328 days.

(21) Appl. No.: 17/972,782

(22) Filed: Oct. 25, 2022

(65) Prior Publication Data

US 2023/0146431 A1    May 11, 2023

(30) Foreign Application Priority Data

Nov. 8, 2021    (EP) ..................................... 21206978

(51) Int. Cl.
*B60W 30/02*    (2012.01)
*B60D 1/32*     (2006.01)
(Continued)

(52) U.S. Cl.
CPC ............... *B60W 30/02* (2013.01); *B60D 1/32* (2013.01); *B60W 10/08* (2013.01); *B60W 10/18* (2013.01);
(Continued)

(58) Field of Classification Search
CPC ...... B60W 30/02; B60W 10/08; B60W 10/18; B60W 10/20; B60W 10/30;
(Continued)

(56) References Cited

U.S. PATENT DOCUMENTS

| | | | |
|---|---|---|---|
| 4,575,110 A | 3/1986 | Kuhn et al. | |
| 8,855,854 B2 | 10/2014 | Schmidt et al. | |
| (Continued) | | | |

FOREIGN PATENT DOCUMENTS

| | | |
|---|---|---|
| EP | 2045155 A1 | 4/2009 |
| GB | 2505666 A | 3/2014 |
| (Continued) | | |

OTHER PUBLICATIONS

Zanchetta, M. et al., "Trailer control through vehicle yaw moment control: Theoretical analysis and experimental assessment," Mechatronics, vol. 64, Dec. 2019, Elsevier Ltd., 18 pages.

(Continued)

*Primary Examiner* — Navid Z. Mehdizadeh
*Assistant Examiner* — Caitlin R Mccleary
(74) *Attorney, Agent, or Firm* — Withrow & Terranova, PLLC

(57) ABSTRACT

A system for probing properties of a trailer towed by a towing vehicle in a heavy-duty vehicle combination. The system comprises at least one torque generating component for inducing movements of the trailer relative to a yaw axis of the trailer; a control unit configured to, during driving of the vehicle combination, activate the torque generating component and apply a pre-determined control action to the torque generating component so as to excite oscillations of the trailer; and at least one detection unit configured to detect the resulting oscillations of the trailer, wherein the control unit is configured to, based on the detected resulting oscillations, determine one or more properties of the trailer. The invention also relates to a probing method.

20 Claims, 5 Drawing Sheets

(51) Int. Cl.
  *B60W 10/08* (2006.01)
  *B60W 10/18* (2012.01)
  *B60W 10/20* (2006.01)
  *B60W 10/30* (2006.01)

(52) U.S. Cl.
  CPC ............ *B60W 10/20* (2013.01); *B60W 10/30* (2013.01); *B60W 2300/14* (2013.01); *B60W 2420/403* (2013.01); *B60W 2420/408* (2024.01); *B60W 2420/54* (2013.01); *B60W 2520/14* (2013.01); *B60W 2520/18* (2013.01); *B60W 2720/14* (2013.01); *B60W 2720/30* (2013.01)

(58) Field of Classification Search
  CPC ....... B60W 2300/14; B60W 2420/403; B60W 2420/408; B60W 2420/54; B60W 2520/14; B60W 2520/18; B60W 2720/14; B60W 2720/30; B60W 2040/1346; B60W 2040/1392; B60W 40/114; B60W 50/02; B60D 1/32; B60D 1/62; B60D 1/30; B60T 2230/06; B60T 8/172; B60T 8/1708; B60R 16/023; B60R 16/0232
  See application file for complete search history.

(56) References Cited

U.S. PATENT DOCUMENTS

| | | | |
|---|---|---|---|
| 2004/0021291 A1* | 2/2004 | Haug | B60T 8/1708 280/455.1 |
| 2008/0275610 A1* | 11/2008 | Terashima | B66C 13/063 700/55 |
| 2010/0332049 A1 | 12/2010 | Sy et al. | |
| 2013/0132025 A1* | 5/2013 | Watanabe | G01M 1/10 702/150 |
| 2018/0093538 A1* | 4/2018 | Rothschild | B60T 8/1708 |
| 2022/0314718 A1* | 10/2022 | Nguyen | B60D 1/62 |

FOREIGN PATENT DOCUMENTS

| | | |
|---|---|---|
| WO | 2019033210 A1 | 2/2019 |
| WO | 2021160252 A1 | 8/2021 |

OTHER PUBLICATIONS

Extended European Search Report for European Patent Application No. 21206978.5, mailed Apr. 20, 2022, 7 pages.
Examination Report for European Patent Application No. 21206978.5, mailed Feb. 12, 2025, 4 pages.

\* cited by examiner

SYSTEM AND METHOD FOR PROBING PROPERTIES OF A TRAILER TOWED BY A TOWING VEHICLE IN A HEAVY-DUTY VEHICLE COMBINATION

RELATED APPLICATIONS

The present application claims priority to European Patent Application No. 21206978.5, filed on Nov. 8, 2021, and entitled "SYSTEM AND METHOD FOR PROBING PROPERTIES OF A TRAILER TOWED BY A TOWING VEHICLE IN A HEAVY-DUTY VEHICLE COMBINATION," which is incorporated herein by reference in its entirety.

TECHNICAL FIELD

The present disclosure relates to a system for probing properties of a trailer towed by a towing vehicle in a heavy-duty vehicle combination. The present disclosure also relates to a heavy-duty vehicle combination comprising such a system. The present disclosure further relates to a method for probing properties of a trailer. Furthermore, the present disclosure relates to a computer program, a computer readable medium and a control unit.

The invention can be applied in heavy-duty vehicles combinations which include towing vehicles, such as trucks or tractors. Although the invention will be focused on implementing the general inventive concept in vehicle combinations which include a truck or a tractor, the general inventive concept is not restricted to this particular towing vehicle, but may also be used in other towing vehicles such as busses. Furthermore, as regards the trailer towed by the towing vehicle, the general inventive concept is not restricted to a particular trailer, but may be used in different types of trailers, such as full trailers and semi-trailers.

BACKGROUND

It is well known to use heavy-duty articulated vehicles for transporting goods. A typical example is a truck which tows a trailer. The trailer usually comprises a drawbar which is connected to a hitch of the truck. As can be readily understood, apart from external factors such as weather conditions, other factors such as the size and distribution of the load carried by the trailer, may affect the dynamic behaviour of the trailer as the tractor-trailer vehicle combination is driven along a road. Instability of such an articulated vehicle may lead to undesired dynamic behaviour, such as snaking or jack-knifing, which in turn may lead to accidents. Such undesired dynamic behaviour may typically be present when the vehicle combination is driving through a curve or changing lanes.

Although modern vehicles have stability controllers that may, to some extent, reduce the risk of undesired dynamic behaviour, there is still a desire to further increase the safety of heavy-duty vehicle combinations.

SUMMARY

An object of the invention is to provide a system and a method for probing properties of a trailer, wherein the result of the probing may be used for further increasing the safety of heavy-duty vehicle combinations. This and other objects, which will become apparent in the following discussion, are achieved by a system and a method according to the independent claims.

The present inventive concept is based on the realization that by actively initiating an oscillation event in the trailer and monitoring the response, different properties of the trailer may be determined. The informational values of such properties may then be of use for a vehicle controller and take appropriate safety measures. It should be understood that the general inventive concept relates to how to obtain said properties of the trailer, and not the subsequent use of the retrieved informational values of the properties. For instance, the general inventive concept may be used for determining the location of the centre of gravity of the trailer. This information can then be used by a vehicle controller to determine a maximum speed for the vehicle combination when driving along a certain curved path in order to avoid rollover of the trailer. However, the subsequent use of the informational value or the trailer property, i.e. in the above example the determination of the maximum speed through the curved path, does not form part of the general inventive concept.

According to a first aspect of the present inventive concept, there is provided a system for probing properties of a trailer towed by a towing vehicle in a heavy-duty vehicle combination. The system comprises:

- at least one torque generating component for inducing movements of the trailer relative to a yaw axis of the trailer,
- a control unit configured to, during driving of the vehicle combination, activate the torque generating component and apply a pre-determined control action to the torque generating component so as to excite oscillations of the trailer,
- at least one detection unit configured to detect the resulting oscillations of the trailer, wherein the control unit is configured to, based on the detected resulting oscillations, determine one or more properties of the trailer.

By providing an oscillation exciting control action, while the vehicle combination is actually being driven, and then detect the resulting oscillations of the trailer, the control unit may determine values of one or more properties of the trailer, which may be important for a vehicle controller, which can then improve its safety measures based on such determined property value(s).

As mentioned previously, the towing vehicle may suitably be a truck or a tractor. The trailer may suitably be a full trailer or a semi-trailer. The trailer may be directly or indirectly connected to the towing vehicle. For instance, a full trailer may be directly connected to the towing vehicle, and a semi-trailer may be connected via a dolly to the towing vehicle.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

It should be understood that the directional terms "yaw", "roll" and "pitch" have their ordinary meaning as normally used in the present technical field. Accordingly, a yaw axis extends from the ground upwards through a vehicle (e.g. through a towing vehicle or through a trailer), and can thus be considered as a vertical axis when driving on a planar horizontal road. The roll axis extends in the longitudinal direction of the vehicle i.e. rear to front, and coincides with the driving direction when the vehicle drives along a straight path. The pitch axis is perpendicular to both the roll axis and the yaw axis, i.e. extending laterally/transversely across the vehicle.

The control action may suitably be adapted to the particular trailer or the particular vehicle combination. Furthermore, the oscillation model may be adapted to different loads. Thus, a control unit may have different predetermined oscillation models to choose from, each predetermined oscillation model being activated by an associated corresponding predetermined control action. Suitably, the control unit may have access to an oscillation model to be used for the particular trailer which is to be probed. The control unit may include or have access to an electronic memory, in which different oscillation models are stored. In such case control unit may select an oscillation model that is appropriate for the particular trailer that is being towed by the towing vehicle in the current heavy-duty vehicle combination.

According to at least one exemplary embodiment, the predetermined control action is associated with a predetermined oscillation model of the trailer, the predetermined oscillation model excluding natural oscillations of the trailer, wherein the control unit is configured to determine said one or more properties of the trailer by comparing the detected resulting oscillations with the predetermined oscillation model. Since the resulting oscillations will include the natural oscillations of the trailer, a comparison with the predetermined oscillation model (which excludes the natural oscillations), will give information about the contribution of the natural oscillation to the resulting oscillation of the trailer. The natural oscillation is sometimes also referred to as eigen oscillation.

Any predetermined oscillation model may suitably include a certain oscillation frequency in one or more directions. For instance, a predetermined oscillation model may include a certain oscillation frequency about the yaw axis and/or about the roll axis. A predetermined oscillation model may additionally include a certain amplitude and phase information. In this connection it may be pointed out that the properties of the trailer may be determined even with small amplitude oscillations, which is advantageous as they cause no concern or disturbance to the driver of the towing vehicle. As indicated above, the control unit may include or have access to an electronic memory in which oscillation model data may be stored. For instance, the oscillation models may be stored in the form of lookup tables or functions. For instance, an oscillation model may include a function in which the roll frequency is a function of the stiffness, the mass and the centre of gravity height. In such an example, if the roll frequency of the trailer is be determined from the detected resulting oscillations, and the values of the mass and stiffness are available, then the centre of gravity height can be determined from the function. The centre of gravity height is a trailer property which may be of use for a subsequent determination of the rollover limit of the trailer.

It should be understood that the detection of the resulting oscillations, performed by the detection unit, may either be performed subsequent to the application of the control action to the torque generating component (i.e. when the control action has ceased and the trailer self-oscillates in free motion) or it may be performed simultaneously with the control action (i.e. the control action may be continued to be applied to the torque generating component while the detection unit detects the resulting oscillations). In the first case, i.e. for self-oscillation (measurement during free motion) the excitation may be short but should suitably exceed a threshold to detect the resulting oscillations. For measurement during torque action (measurement during forced motion) a persistent and random input may be the torque input (in this case the amplitude of excitation may be lower).

As mentioned above, small amplitude control actions are advantageous in that they are not or hardly perceivable by the driver, while providing sufficient motion of the trailer for detecting the resulting oscillations. This is at least partly reflected in the following exemplary embodiment. According to at least one exemplary embodiment, said predetermined control action applied by the control unit is selected such that the amplitude of the predetermined oscillation model is less than 1° relative to the yaw axis.

According to at least one exemplary embodiment, the control unit is configured to determine said one or more properties of the trailer by comparing a frequency of the resulting oscillation of the trailer with a corresponding frequency of said predetermined oscillation model, such as comparing the oscillations about the yaw axis and/or comparing the oscillations about the roll axis. By comparing the frequency of the resulting oscillations of the trailer with a corresponding frequency of the predetermined oscillation model, the natural frequency may be determined for the trailer. Thus, the yaw natural frequency may be determined when the oscillations about the yaw axis are compared, and the roll natural frequency may be determined when the oscillations about the roll axis are compared. This in turn may be used for counteracting the natural oscillations by subsequently applying a neutralizing control action on the torque generating components so as to cancel the natural frequencies of the trailer, thereby improving the driving conditions for the driver. Comparing the oscillations about the roll axis is advantageous as the information may be used for determining/calculating the location of centre of mass (centre of gravity) which in turn may be used for determining rollover limits for the trailer. Furthermore, the roll and yaw frequency information may be of benefit in case the towing vehicle is an autonomous towing vehicle (such as an autonomous truck) to limit the roll and yaw motions of the trailer and hence improve the safety of the heavy-duty vehicle combination.

The present inventive concept can be further used for the purpose of monitoring and diagnostics. For example, if a natural frequency (or amplitude or phase or other measured variable) were to change during operation, this may indicate factors such as a suspension system fault, a shift in the carried load, tyre deflation etc. Use of pattern recognition and other techniques could be used to inform the driver or operator of the situation (or inform a vehicle control unit of an autonomous towing vehicle). Furthermore, data collected from confirmed fault conditions can be stored in a database to further improve the efficacy of the monitoring and diagnostics system making use of roll and yaw motion data.

The determination of the roll natural frequency and/or yaw natural frequency is reflected in the following exemplary embodiment. Thus, according to at least one exemplary embodiment, said one or more properties of the trailer is selected from one or more of the group consisting of:
  the yaw natural frequency of the trailer,
  the roll natural frequency of the trailer,
  the location (such as the height) of the centre of gravity of the trailer.

The determination of the roll natural frequency may, for instance, be performed by using a lookup table and/or a function. Such a lookup table, or other kind of mapping may be created by performing simulations or other engineering analysis. The mapping may be of the roll natural frequency as a function of loaded trailer mass and the height of the centre of gravity. The simulation and/or analysis is dependent on the parameters of the unloaded trailer (e.g. roll stiffness, unloaded weight, drawbar geometry), so the analysis should suitably be performed for each trailer type (though not the individual trailer). Lookup tables for the frequency, amplitude or other measure of response may also be recorded. Existing method may be used to determine the mass of the trailer (or trailer load). For instance, this may be based on change in vehicle longitudinal acceleration during gear changes.

The determination of the yaw natural frequency, may be based on a corresponding approach, though vehicle speed should be accounted for in the mapping (lookup table).

The location of the centre of gravity may suitably be determined via determination of the roll natural frequency, such as by using the stored mapping (lookup table) as discussed above (in which the roll natural frequency is as a function of loaded trailer mass and the height of the centre of gravity).

It should be understood that the excitation of oscillations of the trailer may be performed in different manners within the scope of the general inventive concept. In some exemplary embodiments the oscillations may be by a torque generating component provided at the towing vehicle. For instance, an oscillating movement at the towing vehicle may be propagated to the trailer. In other exemplary embodiments, the torque generating component may be located on the trailer. In other exemplary embodiments, the torque generating component may be provided at an intermediate structure, such as a dolly, wherein oscillating movements of the intermediate structure may be propagated to the trailer. Thus, there are a number of different ways to carry out the general inventive concept. Some different non-limiting examples of exciting oscillations in the trailer will now be presented.

According to at least one exemplary embodiment, the system comprises a hitch assembly configured to be mounted on the towing vehicle, wherein the torque generating component comprises said hitch assembly, wherein the hitch assembly comprises a movable hitch to which the trailer is configured to be connected, wherein said control action by the control unit comprises moving the hitch back and forth in parallel with the pitch axis of the towing vehicle so as to achieve an oscillating movement of the hitch, wherein the oscillating movement of the hitch is transmitted to the trailer, thereby exciting oscillations of the trailer. This is advantageous as the same towing vehicle may be used for exiting oscillations on different trailers, without needing to provide any specific torque generating mechanism on each trailer. The trailer may suitably be connected to the hitch by means of a standard drawbar. The hitch may, for instance, be electronically driven by a linear actuator. Other ways for moving the hitch back and forth are also conceivable, such as using a rotary, electronically controlled, hitch. The hitch assembly may further include other parts, such as a spring and a damper.

According to at least one exemplary embodiment, the torque generating component is a wheel torque generating component, such as a brake or an electric machine operatively connected to one or more wheels of the trailer and configured to provide torque to said one or more wheels, wherein said control action by the control unit comprises alternatingly and repeatedly activating and deactivating the wheel torque generating component so as to excite oscillations of the trailer. As some trailers are already provided with such wheel torque generating components, there is no need to add another torque generating component for implementing the general inventive concept. Suitably, a left wheel and a right wheel on a common axle of the trailer may each be provided with a respective wheel torque generating component. To excite oscillations, the wheel torque generating component may alternatingly be briefly activated on the left wheel and right wheel. For example, in case of the wheel torque generating components comprises brakes, then small and short brake actions will be applied alternatingly and repeatedly to the left wheel and right wheel. Similarly, in case of the wheel torque generating components comprises electric machines, then small and short driving actions will be applied alternatingly and repeatedly to the left wheel and right wheel.

According to at least one exemplary embodiment, the system further comprises a dolly configured to be connected to the towing vehicle, wherein the trailer is configured to be towed by the towing vehicle via the dolly, wherein said torque generating component is a wheel torque generating component, such as a brake or an electric machine operatively connected to one or more wheels of the dolly and configured to provide torque to said one or more wheels, wherein said control action by the control unit comprises alternatingly and repeatedly activating and deactivating the wheel torque generating component so as to excite oscillations of the connected trailer. The dolly may be a steerable dolly or a non-steerable dolly.

According to at least one exemplary embodiment, the system further comprises a steerable dolly configured to be connected to the towing vehicle, wherein the trailer is configured to be towed by the towing vehicle via the steerable dolly, wherein said torque generating component is an actuator configured to turn steerable wheels of the steerable dolly, such as via a wheel axle, wherein said control action by the control unit comprises controlling the actuator to alternatingly and repeatedly turning the steerable wheels left and right so as to excite oscillations to the connected trailer.

Using a dolly, such as exemplified in the above embodiments, is advantageous as it enables the general inventive concept to be implemented for a semi-trailer.

The detection unit provided for detecting the resulting oscillations may be configured in various different ways and provided in different locations. For instance, in some exemplary embodiments the detection unit may be provided on the towing vehicle, while in other exemplary embodiments the detection unit may instead, or additionally, be provided on the trailer. This is reflected in the following exemplary embodiment.

According to at least one exemplary embodiment, the detection unit comprises one or more of:
an image capturing unit, such as a camera, configured to be mounted on the towing vehicle,
a wave emitter and a wave receiver for receiving a reflected wave, such as forming part of a Lidar, radar or ultrasonic detector, configured to be mounted on the towing vehicle,
inertial sensor, such as an IMU or a gyroscope, configured to be mounted on the trailer. Using an image capturing unit or an emitter/receiver setup mounted on the towing vehicle is advantageous in that the same towing vehicle may be used with different trailer, without needing to provide additional detection units on the individual trailers for implementing the general inventive concept. On the other hand, providing an inertial sensor, on the trailer is beneficial since it provides a simple, yet efficient way, to detect the oscillations of the trailer. Irrespective of the type of detection unit that is used, it may suitably send input signals, representing the resulting oscillations, to the control unit. The control unit can process the informational content of the received input signals and determine the values of the trailer property/properties of interest.

According to a second aspect of the present inventive concept, there is provided a heavy-duty vehicle combination comprising a system according to the first aspect, including any embodiment thereof. The advantages of the heavy-duty vehicle combination of the second aspect largely correspond to the advantages of the system of the first aspect, including any embodiment thereof. The heavy-duty vehicle combination may, for instance, comprise a towing vehicle, such as a truck or a tractor, and a trailer, such as a full trailer or a semi-trailer. In some exemplary embodiments, the heavy-duty vehicle combination may comprise a steerable dolly, interconnecting the trailer and the towing vehicle. The towing vehicle may be operated by a driver or may be an autonomous vehicle.

According to a third aspect of the present inventive concept, there is provided a method for probing properties of a trailer towed by a towing vehicle in a heavy-duty vehicle combination, the method comprising:
  inducing movement of the trailer relative to a yaw axis of the trailer by means of at least one torque generating component,
  during driving of the vehicle combination, activating the torque generating component and applying a pre-determined control action to the torque generating component so as to excite oscillations of the trailer,
  detecting the resulting oscillations of the trailer by means of at least one detection unit, and
  determining, based on the detected resulting oscillations, one or more properties of the trailer.

The advantages of the method of the third aspect largely correspond to the advantages of the system of the first aspect, including any embodiment thereof. In particular, according to at least one exemplary embodiment, the method comprises using a system according to the first aspect, including any embodiment thereof.

According to a fourth aspect of the present inventive concept, there is provided a computer program comprising program code means for performing the steps of the method according to the third aspect, including any embodiment thereof, when said program is run on a computer. The advantages of the computer program of the fourth aspect largely correspond to the advantages of the method of the third aspect, including any embodiment thereof.

According to a fifth aspect of the present inventive concept, there is provided a computer readable medium carrying a computer program comprising program code means for performing the steps of the method according to the third aspect, including any embodiment thereof, when said program product is run on a computer. The advantages of the computer readable medium of the fifth aspect largely correspond to the advantages of the method of the third aspect, including any embodiment thereof.

According to a sixth aspect of the present inventive concept, there is provided a control unit for probing properties of a trailer towed by a towing vehicle in a heavy-duty vehicle combination, the control unit being configured to perform the steps of the method according to third aspect, including any embodiment thereof. The advantages of the control unit of the sixth aspect largely correspond to the advantages of the method of the third aspect, including any embodiment thereof.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
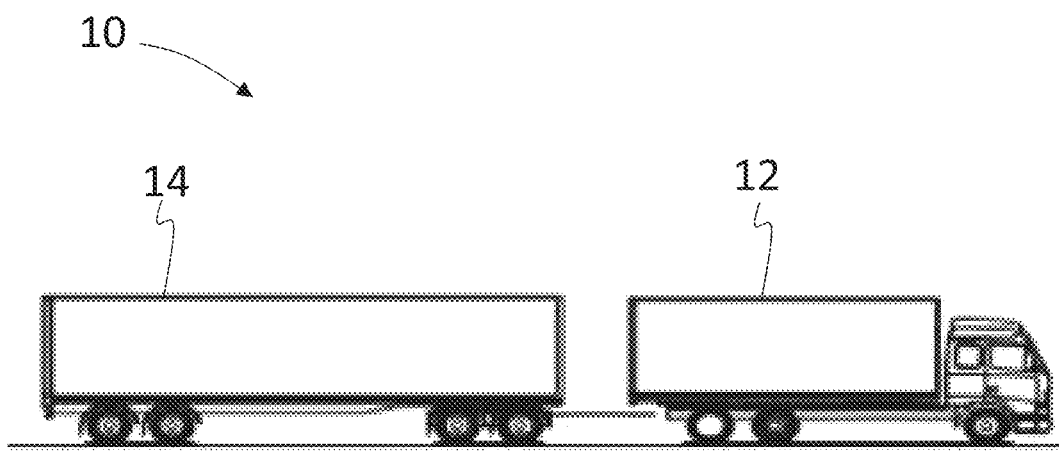
FIG. 1 illustrates a heavy-duty vehicle combination in which a system for probing properties of a trailer may be implemented, in accordance with at least one exemplary embodiment of the present inventive concept.

The invention will now be described more fully hereinafter with reference to the accompanying drawings, in which certain aspects of the invention are shown. The invention may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the present invention is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a heavy-duty vehicle combination 10 in which a system for probing properties of a trailer may be implemented, in accordance with at least one exemplary embodiment of the present inventive concept. The heavy-duty vehicle combination 10 comprises a towing vehicle 12 and a trailer 14 which is towed by the towing vehicle 12. The towing vehicle 12 is here illustrated in the form of a truck, and the trailer 14 is illustrated in the form of a full trailer.

Figure 2:
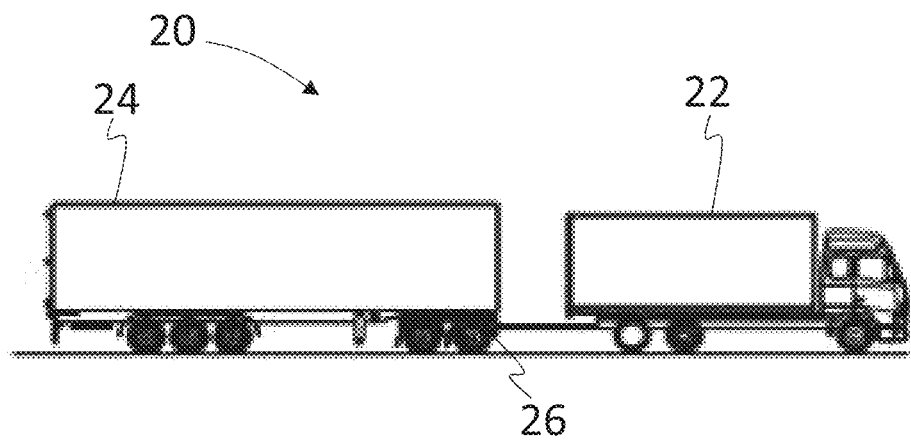
FIG. 2 illustrates another heavy-duty vehicle combination in which a system for probing properties of a trailer may be implemented, in accordance with at least one exemplary embodiment of the present inventive concept.

FIG. 2 illustrates another heavy-duty vehicle combination 20 in which a system for probing properties of a trailer may be implemented, in accordance with at least one exemplary embodiment of the present inventive concept. The heavy-duty vehicle combination 20 comprises a towing vehicle 22, again illustrated in the form of a truck. The heavy-duty vehicle combination 20 also comprises a trailer 24 in the form of a semi-trailer and a dolly, such as a steerable dolly 26. The trailer 24 is connected to the steerable dolly 26, which in turn is connected to the towing vehicle 22.

Figure 3:
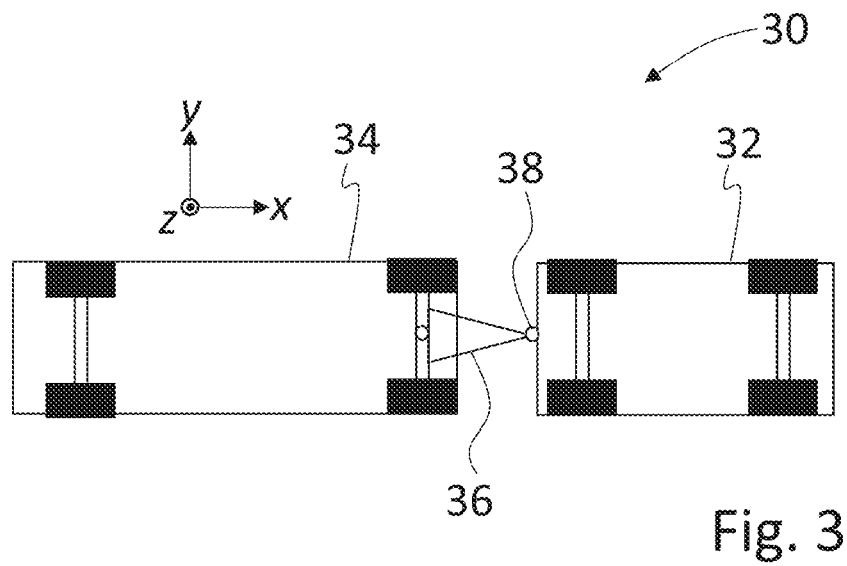
FIG. 3 is a schematic illustration of a heavy-duty vehicle combination in accordance with at least one exemplary embodiment.

FIG. 3 is a schematic illustration of a heavy-duty vehicle combination 30 in accordance with at least one exemplary embodiment, and will be the starting point for a more detailed and exemplifying discussion of the inventive system of this disclosure. Similarly to FIGS. 1 and 2, the heavy-duty vehicle combination 30 comprises a trailer 34 towed by a towing vehicle 32. The trailer 34 may comprise or have a drawbar 36 attached to it, and the drawbar 36 may in turn be connected to a hitch 38 at the rear of the towing vehicle 32.

In FIG. 3 there is also illustrated the different geometrical axes of a vehicle (for example of the trailer 34). The roll axis x runs in the longitudinal direction of the trailer 34, from rear to front. The pitch axis y runs in the transverse direction of the trailer 34, from the right side to the left side of the trailer 34. The yaw axis z runs in the height direction of the trailer 34, from the ground and up through the roof of the trailer 34 (in the illustration the yaw axis z extends perpendicularly to the plane of the drawing). The three axes x, y, z extend perpendicularly to each other.

Figure 4:
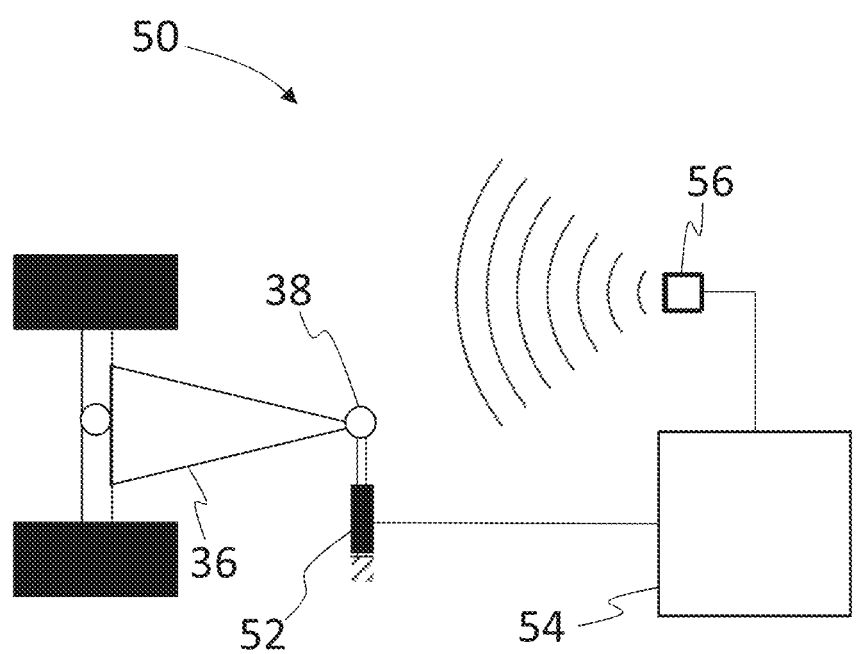
FIG. 4 schematically illustrates components of a system for probing properties of a trailer in the heavy-duty vehicle combination of FIG. 3, in accordance with at least one exemplary embodiment of the present inventive concept.

FIG. 4 schematically illustrates components of a system 50 for probing properties of a trailer, such as the trailer 34 in the heavy-duty vehicle combination 30 of FIG. 3, in accordance with at least one exemplary embodiment of the present inventive concept. FIG. 4 schematically illustrates an enlarged view of the hitch 38 of the towing vehicle 36. An electric actuator 52 (e.g. including a lead screw) is provided for changing the position of the hitch 38 in a direction parallel to the pitch axes y. The hitch 38 and the electric actuator 52 may be comprised in a hitch assembly which in turn may be comprised in or may represent a torque generating component 38, 52. A purpose of this torque generating component 38, 52 is to induce movements of the trailer 34 relative to the yaw axis z of the trailer 34. In addition to the torque generating component 38, 52, the system also comprises a control unit 54. The control unit 54 is configured to, during driving of the heavy-duty vehicle combination 30, activate the torque generating component 38, 52 so as to excite oscillations of the trailer 34. In the illustrated example, the control unit 54 may thus control the electric actuator 52 to move the hitch 38 alternatingly towards the left and right sides of the towing vehicle 32, in order to create a small amplitude control action of the hitch 38, which via the drawbar 36 will be propagated to the trailer 34 which will therefore also oscillate. The oscillations may be of a small amplitude, for example less than 1° relative to the yaw axis z.

It should be understood that the general principal of using a torque generating component and applying a predetermined control action to that torque generating component so as to excite oscillations of the trailer may be achieved in various ways, and that a linear electronic actuator such as the one schematically shown in FIG. 4 is just an illustrative non-limiting example. Another conceivable way to move the hitch 38 would, for instance, be in small rotary movements, alternatingly clockwise/anti-clockwise, using an electronic rotary actuator. Further examples of torque generating components will be discussed in connection with FIG. 5.

Continuing with FIG. 4, the system 50 further comprises at least one detection unit 56 configured to detect the resulting oscillations of the trailer 34. The control unit 54 is configured to, based on the detected resulting oscillations, determine one or more properties of the trailer 34. The detection unit 56 may in some exemplary embodiments comprise an image capturing unit configured to be mounted on the towing vehicle 32. Such an image capturing unit may be a camera. In some exemplary embodiments, the detection unit 56 may be comprise a wave emitter and a wave receiver for receiving a reflected wave. The emitter/receiver may be configured to be mounted on the towing vehicle 32, and may for instance form part of a Lidar, radar or ultrasonic detector. In some exemplary embodiments, the detection unit 56 may comprise an inertial sensor configured to be mounted on the trailer 34. The inertial sensor may for instance comprise an IMU or a gyroscope.

Figure 5:
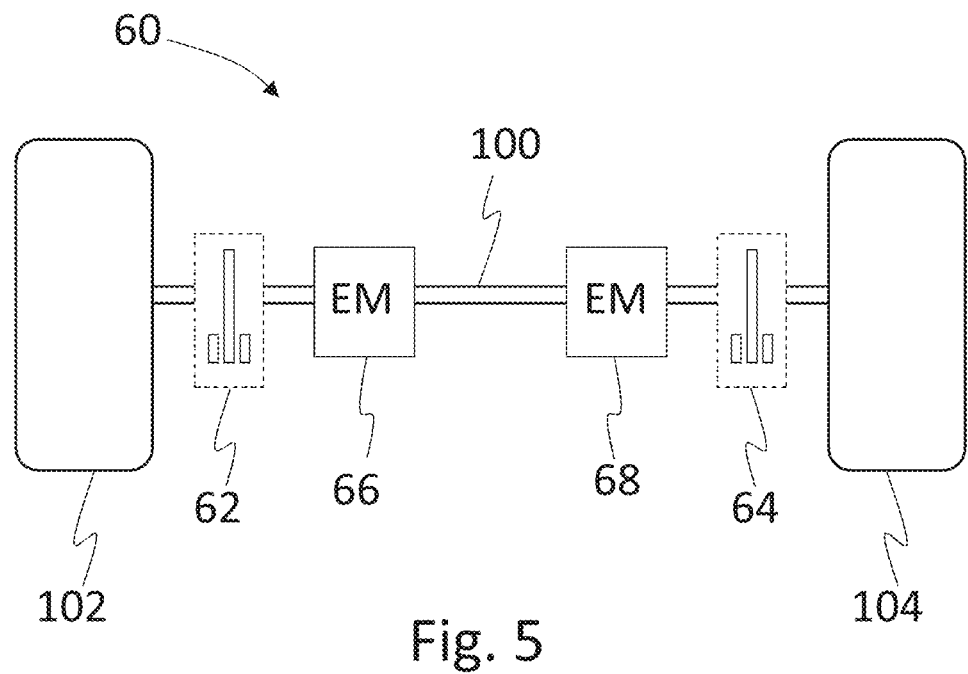
FIG. 5 schematically illustrates components of a system in accordance with at least another exemplary embodiment of the present inventive concept.

FIG. 5 schematically illustrates components of a system 60 in accordance with at least another exemplary embodiment of the present inventive concept. FIG. 5 illustrates a wheel axle 100 of a trailer. It may, for instance, be a front wheel axle of the trailer. The wheel axle 100 carries a left wheel 102 and a right wheel 104. In FIG. 5 there are also schematically illustrated four torque generating components 62, 64, 66, 68, in particular four wheel torque generating components 62, 64, 66, 68, which may form part of the system 60. The four wheel torque generating components 62, 64, 66, 68 include two wheel brakes 62, 64 (for example disk brakes or drum brakes) for providing braking torque to the wheels 102, 104. Each wheel brake 62, 64 is operatively engageable with a respective one of the left wheel 102 and right wheel 104. Furthermore, the two remaining wheel torque generating components are electric machines 66, 68 for providing propulsion torque to the wheels 102, 104. Each electric machine 66, 68 is operatively engageable with a respective one of the left wheel 102 and right wheel 104.

It should be understood that although four wheel torque generating components 62, 64, 66, 68 are illustrated in FIG. 5, in other exemplary embodiments, there may be fewer. For instance, the two electric machines 66, 68 may be omitted in some exemplary embodiments. In other exemplary embodiments the brakes 62, 64 may be omitted for the illustrated axle 100, or not used for oscillation-exciting control action.

In the case of the torque generating component being a wheel torque generating component as the ones illustrated in FIG. 5, the control action by the control unit (such as a control unit 54 as in FIG. 4) may comprise alternatingly and repeatedly activating and deactivating the wheel torque generating component so as to excite oscillation of the trailer. In particular, in exemplary embodiments in which a left wheel and a right wheel of a common wheel axle, each have an associated wheel torque generating components, the activating and deactivating may suitable be alternated between the wheels. For instance, with reference to FIG. 5, in exemplary embodiments in which a left brake 62 and a right brake 64 are implemented as said wheel torque generating component, the control unit may activate the left brake 62 while the right brake 64 is deactivated and then activate the right brake 64 while deactivating the left brake 62. Such alternating braking is repeated to excite the oscillations of the trailer. The actual braking torque of the control action is suitably small enough to avoid causing any concern to the driver. Similarly, in case of using electric machines 66, 68 in the control action, then the electric machines 66, 68 will alternatingly be activated to provide a driving torque to the left wheel 102 and right wheel 104 alternatingly. Although not illustrated in FIG. 5, it should be understood that a control unit, which may suitably be located at the towing vehicle, may similarly to the schematic illustration in FIG. 4, be arranged in operative communication with any wheel torque generating component located at the trailer (such as the wheel torque generating components 62, 64, 66, 68 in FIG. 5). Furthermore, any suitable detection unit for detecting the trailer response to the control action may be used, such as those previously discussed in this disclosure.

In addition to the examples discussed in connection with FIGS. 4 and 5, it should be understood that in heavy-duty vehicle combinations which include a steerable dolly, such as the steerable dolly 26 in FIG. 2, the torque generating component may be an actuator configured to turn steerable wheels of the steerable dolly (such as via a wheel axle of the steerable dolly). In such case the predetermined control action by the control unit may comprise controlling the actuator to alternatingly and repeatedly turning the steerable wheels left and right so as to excite oscillations to the connected trailer. In other exemplary embodiments, there may be provided wheel torque generating components at a wheel axle of the steerable dolly and the predetermined control action may correspond to that discussed in connection with FIG. 5. Such wheel torque generating components and associated predetermined control action may also be implemented for a non-steerable dolly. Thus, in at least some exemplary embodiments, FIG. 5 may be considered to illustrate a wheel axle of a dolly, such as a steerable dolly or a non-steerable dolly.

The predetermined control action applied by the control unit (such as control unit 54 in FIG. 4) may suitably be associated with a predetermined oscillation model of the trailer. Such a predetermined oscillation model may exclude natural oscillations of the trailer, wherein the control unit may be configured to determine said one or more properties of the trailer by comparing the detected resulting oscillations with the predetermined oscillation model. The control unit may be configured to determine said one or more properties of the trailer by comparing a frequency, amplitude, phase or other signal attribute of the resulting oscillation of the trailer with a corresponding frequency, amplitude phase or other signal attribute of said predetermined oscillation model, such as comparing the oscillations about the yaw axis and/or comparing the oscillations about the roll axis. As explained previously in this disclosure, the property or properties of the trailer may be the yaw natural frequency of the trailer, the roll natural frequency of the trailer and the location of the centre of gravity of the trailer (in particular the height of the centre of gravity of the trailer).

As previously explained, by being able to probe such properties of the trailer, the values thereof may be of use for subsequent safety measures. For instance, a vehicle controller may use this to calculate a maximum speed through a certain curve to avoid rollover of the trailer.

Figure 9:
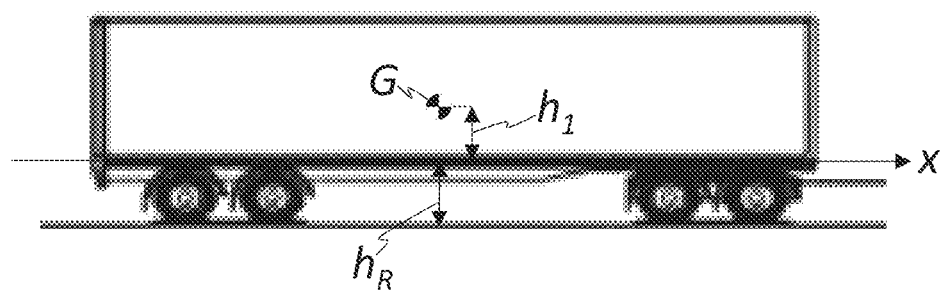
FIG. 9 schematically illustrates a trailer with reference to an example of how to determine the height of the centre of gravity.

As also previously explained, the centre of gravity may suitably be determined via determination of the roll natural frequency. With reference to FIG. 9, an example of such a determination will now be discussed.

FIG. 9 schematically illustrates a trailer with reference to an example of how to determine the height of the centre of gravity. The roll axis x extends in the longitudinal direction of the trailer, as already explained. The detailed relationship between the height of the centre of gravity and the roll natural frequency depends on a range of parameters, including frame compliance and suspension geometry, which is why simulation or testing should suitably be carried out in order to establish the mapping (lookup tables). On the other hand, the underlying physics can be represented in a simple model. In FIG. 9, the mass centre G of the trailer plus load is indicated, as is the height $h_1$ above the roll axis x, which is in turn at a height $h_R$ above ground (at the longitudinal position of G).

If $I_R$ is the roll moment of inertia of the loaded trailer about the roll axis x and $\phi$ is the roll angle of the trailer, then the roll dynamics are governed by the differential equation $I_R\ddot{\phi}+C\dot{\phi}+K\phi=L$ where C and K represent the roll damping and roll stiffness of the suspension respectively, and L is any applied roll moment. The (undamped) natural frequency $f_n$ is given by $$f_n = \frac{1}{2\pi}\sqrt{\frac{K}{I_R}}$$

which is in turn influenced by the value of $h_1$ according to $I_R=I_G+Mh_1^2$

Here $I_G$ is the roll moment of inertia about the mass centre. The overall height of the mass centre above ground is $h_G=h_R+h_1$ The strong coupling between $h_G$, via $I_R$ to the natural frequency $f_n$ is clearly shown.

The above analysis includes certain simplifications, such as the effect of damping on the measured frequency, also the influence of trailer load distribution about its centre of gravity. Such detailed influences are to be included in the simulation-based mapping of natural frequency to applied disturbance.

Figure 6:
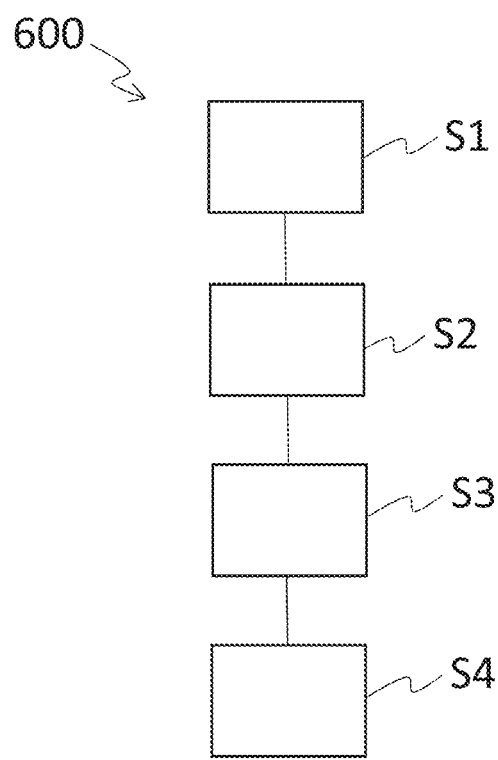
FIG. 6 schematically illustrates a method in accordance with at least one exemplary embodiment of the present inventive concept.

FIG. 6 schematically illustrates a method 600 in accordance with at least one exemplary embodiment of the present inventive concept. In particular, FIG. 6 illustrates a method 600 for probing properties of a trailer towed by a towing vehicle in a heavy-duty vehicle combination, the method 600 comprising:
  in a step S1, inducing movement of the trailer relative to a yaw axis of the trailer by means of at least one torque generating component,
  in a step S2, during driving of the vehicle combination, activating the torque generating component and applying a pre-determined control action to the torque generating component so as to excite oscillations of the trailer,
  in a step S3, detecting the resulting oscillations of the trailer by means of at least one detection unit, and
  in a step S4, determining, based on the detected resulting oscillations, one or more properties of the trailer.

It should be understood that the listing of steps does not mean that they need to be performed in the consecutive order of the list. For instance, steps S1 and S2 may suitably be performed simultaneously. In fact, step S2 may be initiated before step S1.

Suitably, the method 600 may be implemented by using a system for probing properties of a trailer in accordance with the teachings of this disclosure.

Figure 7:
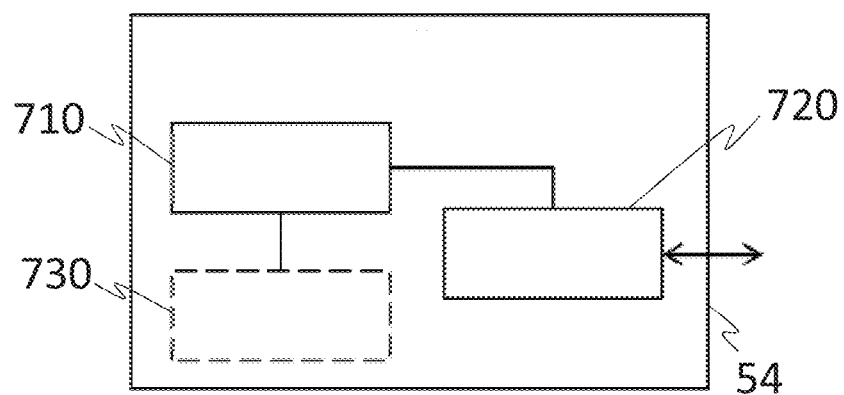
FIG. 7 schematically illustrates a control unit according to at least one exemplary embodiment of the invention.

FIG. 7 schematically illustrates a control unit 54 according to at least one exemplary embodiment of the invention. In particular, FIG. 7 illustrates, in terms of a number of functional units, the components of a control unit 54 according to exemplary embodiments of the discussions herein. The control unit 54 may be comprised in any heavy-duty vehicle combination disclosed herein, such as anyone those illustrated in FIGS. 1-3. Processing circuitry 710 may be provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 54 to perform a set of operations, or steps, such as the method discussed in connection to FIG. 6 and exemplary embodiments thereof discussed throughout this disclosure. For example, the storage medium 730 may store the set of operations, and the processing circuitry 710 may be configured to retrieve the set of operations from the storage medium 730 to cause the control unit 54 to perform the set of operations. The set of operations may be provided as a set of executable instructions. Thus, the processing circuitry 710 is thereby arranged to execute exemplary methods as herein disclosed.

The storage medium 730 may also comprise persistent storage, which, for example may be any single one or combination of magnetic memory, optical memory, solid state memory or even remotely mounted memory.

The control unit 54 may further comprise an interface 720 for communications with at least one external device such as the detection units and torque generating components discussed herein. As such, the interface 720 may comprise one or more transmitters and receivers, comprising analogue and digital components and a suitable number of ports for wireline or wireless communication.

The processing circuitry 710 controls the general operation of the control unit 54, e.g. by sending data and control signals to the interface 720 and the storage medium 730, by receiving data and reports from the interface 720, and by retrieving data and instructions form the storage medium 730. The storage medium 730 may have a plurality of stored predetermined oscillation models, as discussed elsewhere in this disclosure. Other components, as well as the related functionality, of the control unit 54 are omitted in order not to obscure the concepts presented herein.

Figure 8:
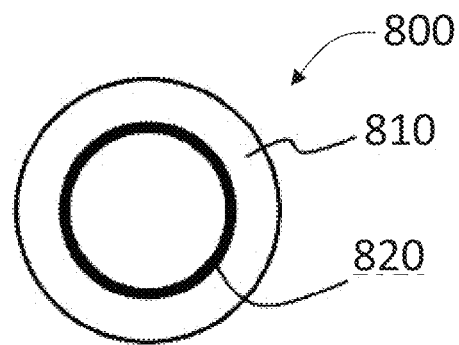
FIG. 8 schematically illustrates a computer program product according to at least one exemplary embodiment of the invention.

FIG. 8 schematically illustrates a computer program product 800 according to at least one exemplary embodiment of the invention. More specifically, FIG. 8 illustrates a computer readable medium 810 carrying a computer program comprising program code means 820 for performing the methods exemplified in FIG. 6, when said program product is run on a computer. The computer readable medium 810 and the program code means 820 may together form the computer program product 800.

The invention claimed is:

1. A system for probing properties of a trailer towed by a towing vehicle in a heavy-duty vehicle combination, the system comprising:
    at least one torque generating component for inducing movements of the trailer relative to a yaw axis of the trailer,
        a control unit configured to, during driving of the heavy-duty vehicle combination, activate the at least one torque generating component and apply a predetermined control action to the at least one torque generating component so as to excite oscillations of the trailer from a non-oscillating state to an oscillating state, and
    at least one detection unit configured to detect the resulting oscillations of the trailer, wherein the control unit is configured to, based on the detected resulting oscillations, determine one or more properties of the trailer.

2. The system of claim 1, wherein the predetermined control action is associated with a predetermined oscillation model of the trailer which excludes natural oscillations of the trailer, wherein the predetermined oscillation model of the trailer is selected from a plurality of predetermined oscillation models, and
    wherein the control unit is configured to determine the one or more properties of the trailer by comparing the detected resulting oscillations with the selected predetermined oscillation model.

3. The system of claim 2, wherein the predetermined control action applied by the control unit is selected such that an amplitude of the selected predetermined oscillation model is less than 1° relative to the yaw axis of the trailer.

4. The system of claim 2, wherein the control unit is configured to determine the one or more properties of the trailer by comparing a frequency of the resulting oscillations of the trailer with a corresponding frequency of the selected predetermined oscillation model.

5. The system of claim 1, wherein the one or more properties of the trailer are one or more of a yaw natural frequency of the trailer,
    a roll natural frequency of the trailer, and
    a location of the centre of gravity of the trailer.

6. The system of claim 1, further comprising:
    a hitch assembly configured to be mounted on the towing vehicle,
    wherein the at least one torque generating component comprises the hitch assembly,
    wherein the hitch assembly comprises a movable hitch to which the trailer is configured to be connected,
    wherein the predetermined control action by the control unit comprises moving the hitch back and forth in parallel with a pitch axis of the towing vehicle so as to achieve an oscillating movement of the movable hitch, and
    wherein the oscillating movement of the movable hitch is transmitted to the trailer, thereby exciting oscillations of the trailer.

7. The system of claim 1, wherein the at least one torque generating component is a wheel torque generating component, and
    wherein the predetermined control action by the control unit comprises alternatingly and repeatedly activating and deactivating the wheel torque generating component so as to excite oscillations of the trailer.

8. The system of claim 7, wherein the wheel torque generating component is a brake or an electric machine, operatively connected to one or more wheels of the trailer, and configured to provide torque to the one or more wheels.

9. The system of claim 1, further comprising a dolly configured to be connected to the towing vehicle,
  wherein the trailer is configured to be towed by the towing vehicle via the dolly,
  wherein the at least one torque generating component is a wheel torque generating component, and
  wherein the predetermined control action by the control unit comprises alternatingly and repeatedly activating and deactivating the wheel torque generating component so as to excite oscillations of the trailer.

10. The system of claim 9, wherein the wheel torque generating component is a brake or an electric machine, operatively connected to one or more wheels of the trailer, and configured to provide torque to the one or more wheels.

11. The system of claim 1, further comprising a steerable dolly configured to be connected to the towing vehicle,
  wherein the trailer is configured to be towed by the towing vehicle via the steerable dolly,
  wherein the at least one torque generating component is an actuator configured to turn steerable wheels of the steerable dolly, and
  wherein the predetermined control action by the control unit comprises controlling the actuator to alternatingly and repeatedly turn the steerable wheels to the left and to the right so as to excite oscillations to the trailer.

12. The system of claim 1, wherein the at least one detection unit comprises one or more of: (i) an image capturing unit configured to be mounted on the towing vehicle, (ii) a wave emitter and a wave receiver for receiving a reflected wave configured to be mounted on the towing vehicle, and (iii) an inertial sensor configured to be mounted on the trailer.

13. The system of claim 12, wherein the at least one detection unit comprises the image capturing unit, and the image capturing unit comprises a camera.

14. The system of claim 12, wherein the at least one detection unit comprises the wave emitter and wave receiver for receiving the reflected wave, wherein the wave emitter and wave receiver form part of a LIDAR, radar, or ultrasonic detector.

15. The system of claim 12, wherein the at least one detection unit comprises the inertial sensor, the inertial sensor being an inertial measurement unit (IMU) or a gyroscope.

16. A heavy-duty vehicle combination comprising the system of claim 1.

17. A method for probing properties of a trailer towed by a towing vehicle in a heavy-duty vehicle combination, the method comprising:
  inducing movement of the trailer relative to a yaw axis of the trailer by means of at least one torque generating component,
  during driving of the heavy-duty vehicle combination, activating the at least one torque generating component and applying a predetermined control action to the at least one torque generating component so as to excite oscillations of the trailer from a non-oscillating state to an oscillating state,
  detecting the resulting oscillations of the trailer by means of at least one detection unit, and
  determining, based on the detected resulting oscillations, one or more properties of the trailer.

18. A computer program product comprising a non-transitory computer readable medium having stored thereon a computer program comprising instructions for performing the method of claim 17 when the computer program is run on a computer.

19. A control unit for probing properties of the trailer towed by the towing vehicle in the heavy-duty vehicle combination, the control unit being configured to perform the method of claim 17.

20. A system for probing properties of a trailer towed by a towing vehicle in a heavy-duty vehicle combination, the system comprising:
  an electronic control unit configured to:
    apply, during driving of the heavy-duty vehicle combination, a predetermined control action to excite oscillations of the trailer about a yaw axis from a non-oscillating state, the predetermined control action comprising at least one of (i) alternatingly moving a hitch towards opposite sides of the towing vehicle, or (ii) alternatingly controlling wheel torque on opposite sides of the towing vehicle, and
    receive, from a detector of the towing vehicle, resulting oscillations of the trailer,
    determine, based on the applied predetermined control action and the detected resulting oscillations, one or more properties of the trailer.

* * * * *